United States Patent [19]

Cobbledick et al.

[11] Patent Number: 5,132,052
[45] Date of Patent: Jul. 21, 1992

[54] FAST CURE IN-MOLD COATING

[75] Inventors: David S. Cobbledick, Kent; Donald F. Reichenbach, Massillon; Brian J. Sullivan, Mogadore, all of Ohio

[73] Assignee: GenCorp Inc., Fairlawn, Ohio

[21] Appl. No.: 672,510

[22] Filed: Mar. 20, 1991

[51] Int. Cl.$^5$ .............................................. H01B 1/06
[52] U.S. Cl. .................... 252/511; 264/255; 264/257; 427/133; 428/413; 428/482
[58] Field of Search ............... 252/511, 506; 524/495, 524/496; 427/133; 264/255, 257, 259; 428/413, 423–427, 482

[56] References Cited

U.S. PATENT DOCUMENTS 4,515,710 5/1985 Cobbledick ............................ 252/511
4,534,888 8/1985 Cobbledick ............................ 252/511

Primary Examiner—William R. Dixon, Jr.
Assistant Examiner—Margaret V. Einsmann

[57] ABSTRACT

The cure rate or time of an in-mold coating composition is greatly enhanced by the use of a minor component by weight of a catalyst or initiator in the in-mold composition comprising essentially t-butyl peroxyisobutyrate.

7 Claims, No Drawings

FAST CURE IN-MOLD COATING

This invention relates to an in-mold coating composition providing a fast cure on a substrate such as fiber reinforced polymer (FRP).

SUMMARY OF THE INVENTION

About 1.0 to 1.5 parts by weight of a catalyst or initiator comprising essentially t-butyl peroxyisobutyrate per 100 parts by weight of the in-mold composition provides a cure time for the in-mold coating cycle of about 15 seconds without any adverse effects on either flow or coverage of the in-mold coating composition on the substrate such as an FRP molding.

DISCUSSION OF DETAILS

According to the present invention, an FRP molding can be in-mold coated in about 15 seconds at about 300° F. using a free radical initiated or catalyzed system comprising:

IN-MOLD COATING COMPOSITION (a) 100 parts by weight of at least one polymerizable epoxy based oligomer or urethane based oligomer or mixture thereof having at least two acrylate groups and a weight average molecular weight of from about 250 to 1,500.

(b) from about 80 to 160 parts by weight of at least one copolymerizable ethylenically unsaturated monomer, (c) from about 10 to 120 parts by weight of at least one copolymerizable monoethylenically unsaturated compound having a —CO— group and a —NH$_2$, —NH— and/or —OH group, (d) from 0 to 90 parts by weight of polyvinyl acetate, (e) from about 0.2 to 5 parts by weight of at least one zinc salt of a fatty acid having at least 10 carbon atoms, (f) from about 0.01 to 1.0 part by weight of at least one accelerator for a peroxide initiator, (g) from about 5 to 30 parts by weight of conductive carbon black, (h) from about 50 to 155 parts by weight of a filler and (i) from 0 to 120 parts by weight of at least one copolymerizable polyoxyalkylene glycol based oligomer having two acrylate groups.

Optionally and desirably, there additionally can be added to the foregoing composition (j) at least one calcium salt of a fatty acid having at least 10 carbon atoms in an amount of from about 0.2 to 5 parts by weight.

An organic free radical peroxide initiator is used in the in-mold coating composition in an amount of up to about 5%, preferably up to 2%, by weight based on the weight of the polymerizable ethylenically unsaturated materials.

The polymerizable epoxy based oligomer having at least two acrylate (or methacrylate or ethacrylate) groups is prepared by reacting acrylic acid, methacrylic acid or ethacrylic acid and so forth with an epoxy based oligomer or resin such as a Bisphenol A epoxy, a tetrabromo Bisphenol A epoxy, phenolic novolak epoxy, tetraphenylolethane epoxy, dicycloaliphatic epoxy and so forth. Mixtures of these epoxy based oligomers may be used. Of these materials it is preferred to use a diacrylate terminated Bisphenol A epoxy oligomer. They have weight average molecular weights of from about 500 to 1,500. These materials are well known. For more information on these materials see "Heat Resistant Vinyl Ester Resin," M. B. Launikitis, Technical Bulletin, SC:116-76, Shell Chemical Company, June 1976 and Shell Chemical Company Technical Bulletins SC:16-76 and SC:60-78.

The polymerizable urethane based oligomer having at least two acrylate (or methacrylate or ethacrylate) groups include a polyesterurethane diacrylate, a polyetherurethane diacrylate or a polyesteretherurethane diacrylate or other polyurethane oligomer having two acrylate groups. These materials may be made by reacting a polyetherdiol (e.g., a polypropylene ether diol), polyesterdiol (e.g., a polyethylene adipate diol) and/or a polyetherester diol (e.g., a polypropylene ether adipate diol) and so forth with a diisocyanate like tolylene diisocyanate, 4,4'-diphenylmethane diisocyanate, hexamethylene diisocyanate and the like in an amount sufficient to form a diisocyanate terminated polyurethane prepolymer which is then reacted with hydroxy propyl acrylate, hydroxy ethyl acrylate, hydroxy ethyl methacrylate and so forth to form the diacrylate terminated polyurethane oligomer or polymer. Mixtures of these acrylate terminated polyurethane oligomers may be used. Acrylate terminated polyurethane oligomers, e.g., curable by light, ultraviolet, electric beam and/or infrared and so forth, are well known, and sometimes are referred to as irradiation or radiation curable materials.

A copolymerizable ethylenically unsaturated monomer is used to copolymerize with and to crosslink the polymerizable oligomers and includes styrene (preferred), alpha methyl styrene, vinyl toluene, t-butyl styrene, chlorostyrene, methyl methacrylate, diallyl phthalate (with styrene or methyl methacrylate and the like) triallyl cyanurate, triallyl isocyanurate divinyl benzene, methyl acrylate and so forth and mixtures thereof. The unsaturated monomer is used in an amount of about 80 to 160 parts by weight per 100 parts by weight of the polymerizable oligomer.

For further copolymerization and crosslinking and to improved hardness of the resulting coating there is used in the in-mold coating composition a monoethylenically unsaturated compound having a

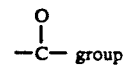

and having a —NH$_2$—, —NH— and/or —OH group. Examples of such monomeric compounds are hydroxyl propyl methacrylate (preferred), hydroxyethyl methacrylate, hydroxy ethyl acrylate, hydroxy ethyl crotonate, hydroxypropyl acrylate, hydroxy polyoxypropylene acrylate, hydroxy polyoxypropylene methacrylate, hydroxy polyoxyethylene methacrylate, acrylamide, methacrylamide, N-hydroxymethyl acrylamide, N-hydroxymethyl methacrylamide and so forth and mixtures of the same. These compounds are used in an amount of from about 10 to 120 parts by weight per 100 parts by weight of the polymerizable oligomer.

Polyvinyl acetate is employed in the in-mold composition to improve paint adhesion of the in-mold coating to the substrate. The polyvinyl acetate is employed in a minor amount by weight as compared to the total weight of the ethylenically unsaturated materials in the in-mold coating composition and sufficient for paint adhesion. The polyvinyl acetate is employed in an amount of from 0 to 90 parts by weight per 100 parts by weight of the polymerizable oligomer.

A zinc salt of a fatty acid having at least 10 carbon atoms, also, is employed in the in-mold coating composition and appears to function as a mold release agent and as a secondary accelerator for the cure. Fatty acids are well known. See "Organic Chemistry," Fieser and Fieser, D. C. Heath and Company, Boston, 1944, pages 88, 381–390, 398 and 401 and "Hackh's Chemical Dictionary," Grant, McGraw Hill Book Company, NY, 1969, page 261. Mixtures of zinc salts of the fatty acids can be used. Examples of some zinc salts are zinc palmitate, zinc stearate, zinc ricinoleate and the like. It is preferred to use the zinc salt of a saturated fatty acid such as zinc stearate. See, also, "Whittington's Dictionary Of Plastics," Whittington, Technomic Publishing Co., Inc., Stamford, Conn., 1968, pages 35, 102 and 261. The zinc salt is used in an amount from about 0.2 to 5 Parts by weight per 100 parts by weight of the polymerizable oligomer.

An accelerator is used for the peroxide initiator and is a material such as a drier, e.g., cobalt octoate (preferred). Other materials which may be used are zinc naphthenate, lead naphthenate, cobalt naphthenate and manganese naphthenate. Soluble Co, Mn and Pb salts of linoleic acid, also be used. Mixtures of accelerators may be used. The accelerator is used in an amount of from about 0.01 to 1 part by weight per 100 parts by weight of the polymerizable oligomer.

Conductive carbon black is used in the in-mold coating composition in an amount of from about 5 to 30 parts by weight per 100 parts by weight of the polymerizable oligomer.

A filler is used in the in-mold coating composition in an amount of from about 50 to 155 parts by weight per 100 parts by weight of the polymerizable oligomer. Examples of fillers are clay, MgO, $Mg(OH)_2$, $CaCO_3$, silica, calcium silicate, mica, aluminum hydroxide, barium sulfate, talc, hydrated silica, magnesium carbonate and mixtures of the same. The fillers should be finely divided. Of these fillers it is preferred to use talc. Fillers can afford the desired viscosity and flow to the in-mold composition for molding and contribute to the desired physical properties in the resulting thermoset in-mold coating. Fillers, also, may improve adhesion. However, care should be exercised in the use of high filler contents as this may give high viscosities and result in flow and handling difficulties.

There further can be employed in the in-mold coating composition a copolymerizable polyoxyalkylene glycol diacrylate compound having a weight average molecular weight of from about 250 to 5,000, in an amount of from about 0 to 120 parts by weight per 100 parts by weight of polymerizable oligomer.

Examples of said diacrylate compounds include triethylene glycol diacrylate, tetraethylene glycol diacrylate, tetraethylene glycol dimethacrylate, polyethylene glycol diacrylate, polypropylene glycol diacrylate, ethoxylated Bisphenol A diacrylate, ethoxylated Bisphenol A dimethacrylate, polyethylene glycol dimethacrylate or polyoxyethylene glycol dimethacrylate, polypropylene glycol dimethacrylate, polyethylene propylene glycol diacrylate, and so forth and mixtures thereof. These acrylates are made by reacting polyoxyalkylene glycols such as polypropylene ether glycol with acrylic acid, methacrylic acid and the like. Since some of these reactive difunctional materials may be made by reacting unsaturated acids and alcohols, they may contain some OH and/or COOH groups.

Optionally and desirably also a calcium salt of a fatty acid having at least 10 carbon atoms, from about 0.2 to 5 parts by weight of calcium salt per 100 parts by weight of the polymerizable oligomer, can be used in the in-mold coating composition as a mold release agent and to control the rate of the cure. Fatty acids are well known, see above. Mixtures of calcium salts of the fatty acids can be used. Examples of some calcium salts are calcium stearate, calcium palmitate, calcium oleate and the like. It is preferred to use the calcium salt of a saturated fatty acid like calcium stearate.

The in-mold composition optionally may be additionally compounded with mold release agents, anti-degradants, U-V absorbers, paraffin wax, solid glass or resin micro-spheres, thickening agents, and the like. These compounding ingredients should be used in amounts sufficient to provide satisfactory results.

It is not desirable to use in the in-mold composition of this invention materials like fatty alcohol phosphates.

The ingredients of the in-mold composition should be readily mixed and handled at ambient or room temperature or temperatures below the polymerization temperature so that they may be readily pumped to the mold or injected into the same. The ingredients may be warmed or heated before or during mixing and mixed in steps to facilitate thorough mixing, dispersion and solution of the same. Also, the bulk of the ingredients may be thoroughly mixed and the remainder including the catalyst separately mixed and then both pumped to a mixing head to be mixed together and then injected into the mold.

The initiator is preferably added to the composition and thoroughly mixed therewith just before molding.

All of the ingredients of the in-mold coating composition should be kept dry or have a minimal amount of moisture or the water content should be controlled to obtain reproducible results and to prevent pore formation.

Mixing of the ingredients of the in-mold composition should be thorough. Injection or compression, transfer molding, or other molding apparatus or machines can be used for the in-mold coating. The in-mold coating composition can be applied to the substrate and cured at a temperature of about 300° F. and at a pressure of about 1000 psi.

The processes and products of the present invention can be used in the manufacture of laminates like automobile parts such as grille and headlamp assemblies, deck hoods, fenders, door panels and roofs as well as in the manufacture of food trays, appliance and electrical components, furniture, machine covers and guards, bathroom components, structural panels and so forth. The glass fiber reinforced thermoset plastic (FRP) such as the polyester resin or vinyl ester resin, styrene and glass fiber composition substrate to which the in-mold composition is applied can be a sheet molding compound (SMC) or a bulk molding compound (BMC), or other thermosetting FRP material as well as a high strength molding compound (HMC) or a thick molding compound (TMC). The FRP substrate can have from about 10 to 75 percent by weight of glass fibers. The SMC compound usually contains from about 25 to 30 percent by weight of glass fibers while the HMC compound may contain from about 55 to 60 percent by weight of glass fibers. The glass fiber reinforced thermoset plastic (FRP) substrate can be rigid or semi-rigid (may contain a flexibilizing moiety such as an adipate group in the polyester). The substrate, also, may contain other flexibilizing polymers, the elastomers and plastomers, such as the styrene-butadiene block copolymers.

For more information on in-mold coating, see U.S. Pat. Nos. 4,515,710 and 4,534,888.

The following Example will serve to illustrate the invention to those skilled in the art.

EXAMPLE

In-mold compositions were prepared, mixed and molded onto an FRP substrate. The in-mold compositions and results obtained are shown below:

| Component I (In-Mold Comp.) | |
|---|---|
| Ingredient | Parts by Weight |
| Low profile additive LP-90 (40% by wt. of polyvinyl acetate in styrene) | 25.00 |
| Hydroxy propyl methacrylate (ROCRYL 410) | 30.00 |
| Styrene | 45.35 |
| 2% benzoquinone in styrene | 7.00 |
| Zinc stearate | 1.85 |
| Calcium stearate | 0.45 |
| Cobalt hex-chem (cobalt octoate) (12% cobalt in mineral oil) | 0.15 |
| Acrylate terminated epoxy based oligomer or resin of Bisphenol A (Ebecryl 3700-15S, 15% styrene + 85% Ebecryl | 117.65 |
| Conductive furnace carbon black (Vulcan XC-72R) | 8.50 |
| Ground talc (WC & D 4404 Talc) | 80.00 |

About 1.5 parts by weight of the various catalyst components listed in the table below per 100 parts of weight of Component I (basic in-mold composition) was used.

TABLE

| Catalyst | Half Life One-Hour | Gel Time | Hot Strength | Molded Performance | | Cure Time |
| | | | | Adhesion | Appearance | |
|---|---|---|---|---|---|---|
| t-Butylperoxy Isobutyrate | 102 | 5.6 min | Good | Good | Normal | 15 Sec |
| t-Butylperoxy Maleic Acid | 110 | >30.0 min | None | None | No Cure | 30 Sec |
| t-Butylperoxy Acetate | 123 | 8.7 min | Good | Good | Normal | 30 Sec |
| t-Butylperoxy Benzoate | 125 | 9.2 min | Good | Good | Normal | 30 Sec |
| t-Butylperoxy Neodeconate | 66 | 4.1 min | Poor | None | Blistered | 30 Sec |
| t-Butylperoxy Pivalate | 76 | 3.4 min | Poor | None | Blistered | 30 Sec |
| t-Butylperoxy Octoate | 95 | 3.9 min | Poor | Good | Normal | 30 Sec |

The above Example shows that t-butyl peroxyisobutyrate gave superior properties including a cure time at 300° F. of only 15 seconds.
While mixtures of one or more peroxide catalysts with t-butyl peroxyisobutylate may be used, the advantage of using t-butyl peroxyisobutylate may be diluted or lost.

What is claimed is:

1. A thermosetting coating composition, comprising:
   (1) a composition including:
   a. about 25 parts by weight of a solution having about 40 percent by weight of polyvinyl acetate in styrene;
   b. about 30 parts by weight of hydroxyl propyl methacrylate;
   c. about 45 parts by weight of styrene;
   d. about 7 parts by weight of a solution having about 2 percent by weight of benzoquinone;
   e. about 1.85 parts by weight of zinc stearate;
   f. about 0.45 parts by weight of calcium stearate;
   g. about 0.15 parts by weight of a cobalt octoate solution containing about 12 percent cobalt;
   h. about 118 parts by weight of a solution having about 85 percent by weight of an acrylate terminated epoxy based oligomer or resin of bisphenol A;
   i. about 8.5 parts by weight of conductive carbon black;
   j. about 80 parts by weight of round talc; and
   (2) about 1.0 to about 1.5 parts by weight of t-butyl peroxyisobutyrate per 100 parts by weight of said in-mold composition.

2. A method of in-mold coating a molded thermoset fiber reinforced composition comprising the steps of:
   (1) mixing an in-mold coating composition comprising:
   a. about 25 parts by eight of a solution having about 40 percent by weight of polyvinyl acetate in styrene;
   b. about 30 parts by weight of hydroxy propyl methacrylate;
   c. about 45 parts by weight of styrene;
   d. about 7 parts by weight of a solution having about 2 percent by weight of benzoquinone;
   e. about 1.85 parts by weight of zinc stearate;
   f. about 0.45 parts by weight of calcium stearate;
   g. about 0.15 parts by weight of a cobalt octoate solution containing about 12 percent cobalt;
   h. about 118 parts by weight of a solution having about 85 percent by weight of an acrylate terminated epoxy based oligomer or resin of bisphenol A;
   i. about 8.5 parts by weight for conductive carbon black;
   j. about 80 parts by weight of ground talc; and
   (2) utilizing t-butyl peroxyisobutyrate at a ratio of about 1.0 to about 1.5 parts by weight per 100 parts by weight of said in-mold coating composition;
   (3) applying said in-mold coating composition, including said t-butyl peroxyisobutyrate, to said molded thermoset fiber reinforced composition; and
   (4) then curing said in-mold composition to form an adherent coating on said molded thermoset fiber reinforced composition.

3. The product produced by the method of claim 2.

4. A laminate comprising a thermoset in-mold composition adhered to a thermoset fiber reinforced composition, said in-mold composition comprising the reaction product of:
   (1) a composition including:

a. about 25 parts by weight of a solution having about 40 percent by weight of polyvinyl acetate in styrene;
b. about 30 parts by weight of hydroxy propyl methacrylate;
c. about 45 1 parts by weight of styrene;
d. about 7 parts by weight of a solution having about 2 percent by weight of benzoquinone;
e. about 1.85 parts by weight of zinc stearate;
f. about 0.45 parts by weight of calcium stearate;
g. about 0.15 parts by weight of a cobalt octoate solution containing about 12 percent cobalt;
h. about 118 parts by weight of a solution having about 85 percent by weight of an acrylate terminated epoxy based oligomer or resin of bisphenol A;
i. about 8.5 parts by weight of conductive carbon black;
j. about 80 parts by weight of ground talc; and
(2) about 1.0 to about 1.5 parts by weight of t-butyl peroxyisobutyrate per 100 parts by weight of said composition.

5. A composition useful as a thermosetting coating composition, comprising:
(a) 100 parts by weight of at least one polymerizable epoxy based oligomer or urethane based oligomer or mixture thereof having at least two acrylate groups and a weight average molecular weight of from about 250 to 1,500,
(b) from about 80 to 160 parts by weight of at least one copolymerizable ethylenically unsaturated monomer,
(c) from about 10 to 120 parts by weight of at least one copolymerizable monoethylenically unsaturated compound having a —CO— group and a —NH$_2$, —NH— and/or —OH group,
(d) from 0 to 90 parts by weight of polyvinyl acetate,
(e) from about 0.2 to 5 parts by weight of at least one zinc salt of a fatty acid having at least 10 carbon atoms,
(f) from about 0.01 to 1.0 part by weight of at least one accelerator for a peroxide initiator,
(g) from about 5 to 30 parts by weight of conductive carbon black,
(h) from about 50 to 155 parts by weight of a filler,
(i) from 0 to 120 parts by weight of at least one copolymerizable polyoxyalkylene glycol based oligomer having two acrylate groups,
(j) an organic free radical peroxide initiator in an amount of up to about 5%, preferably not more than 2%, by weight based on the weight of the polymerizable ethylenically unsaturated materials, wherein said organic free radical peroxide initiator is t-butyl peroxyisobutyrate, and optionally
(k) at least one calcium salt of a fatty acid having at least 10 carbon atoms in an mount of from about 0.2 to 5 parts by weight.

6. A method of in-mold coating a molded thermoset fiber reinforced polymer substrate comprising the steps of:
(1) mixing ian in-mold coating composition comprising:
(a) 100 parts by weight of at least one polymerizable epoxy based oligomer or urethane based oligomer or mixture thereof having at least two acrylate groups and a weight average molecular weight of from about 250 to 1,500,
(b) from about 80 to 160 parts by weight of at least one copolymerizable ethylenically unsaturated monomer,
(c) from about 10 to 120 parts by weight of at least one copolymerizable monoethylenically unsaturated compound having a —CO— group and a —NH$_2$, —NH— and/or —OH group,
(d) from 0 to 90 parts by weight of polyvinyl acetate,
(e) from about 0.2 to 5 parts by weight of at least one zinc salt of a fatty acid having at least 10 carbon atoms,
(f) from about 0.01 to 1.0 part by weight of at least one accelerator for a peroxide initiator,
(g) from about 5 to 30 parts by weight of conductive carbon black,
(h) from about 50 to 155 parts by weight of a filler,
(i) from 0 to 120 parts by weight of at least one copolymerizable polyoxyalkylene glycol based loigomer having of acrylate groups and optionally,
(j) at least one calcium salt of a fatty acid having at least 10 carbon atoms in an amount of from about 0.2 to 5 parts by weight;
(2) utilizing as an initiator in said in-mold coating composition t-butyl peroxyisobutyrate in an amount of from about 2 percent to about 5 percent by weight based on the weight of the polymerizable ethylenically unsaturated materials of step (1);
(3) applying said in-mold coating composition, including said initiator, to said molded thermoset fiber reinforced polymer substrate; and
(4) then curing said in-mold composition to form an adherent thermoset coating on said substrate.

7. The product produced by the method of claim 6.

* * * * *